(12) United States Patent
Knapp

(10) Patent No.: US 10,843,808 B2
(45) Date of Patent: Nov. 24, 2020

(54) METHODS AND APPARATUS FOR CRYOGENIC FUEL BAYONET TRANSFERS

(71) Applicant: Insitu, Inc., Bingen, WA (US)

(72) Inventor: Jeffrey H. Knapp, Hood River, OR (US)

(73) Assignee: Insitu, Inc., Bingen, WA (US)

( * ) Notice: Subject to any disclaimer, the term of this patent is extended or adjusted under 35 U.S.C. 154(b) by 717 days.

(21) Appl. No.: 15/364,126

(22) Filed: Nov. 29, 2016

(65) Prior Publication Data

US 2018/0151898 A1    May 31, 2018

(51) Int. Cl.
*B64D 37/14*    (2006.01)
*F17C 6/00*    (2006.01)
(Continued)

(52) U.S. Cl.
CPC ............ *B64D 37/14* (2013.01); *B64C 39/024* (2013.01); *B64D 37/30* (2013.01); *F17C 5/02* (2013.01); *F17C 6/00* (2013.01); *F17C 7/02* (2013.01); *F17C 9/00* (2013.01); *H01M 8/04201* (2013.01); *B64C 2201/042* (2013.01); *B64D 2041/005* (2013.01); *F16L 37/248* (2013.01); *F17C 2201/0109* (2013.01); *F17C 2203/03* (2013.01); *F17C 2203/0391* (2013.01); *F17C 2205/0332* (2013.01); *F17C 2205/0335* (2013.01); *F17C 2205/0391* (2013.01); *F17C 2221/012* (2013.01); *F17C 2221/033* (2013.01); *F17C 2223/0161* (2013.01); *F17C 2223/047* (2013.01); *F17C 2225/0123* (2013.01); *F17C 2225/047* (2013.01); *F17C 2227/00* (2013.01); *F17C 2260/012* (2013.01); *F17C 2265/07* (2013.01); *F17C 2270/0184* (2013.01); *F17C 2270/0189* (2013.01);
(Continued)

(58) Field of Classification Search
CPC ...... F17C 5/02; F17C 6/00; F17C 7/02; F17C 9/00; F17C 2201/012; F17C 2205/0391; F17C 2205/0335; F17C 2205/0332; F17C 2205/03; F17C 2221/033; F17C 2223/047; F17C 2223/0161; F17C 2225/047; F17C 2225/0123; F17C 2227/00; F17C 2260/012; F17C 2265/07; F17C 2270/0189; F17C 2270/0184; F17C 2270/0581; B64D 37/14; B64D 37/30; B64D 39/024; B64D 2201/042; H01M 8/04201; H01M 2250/20; Y02T 50/44; Y02T 90/32; Y02T 90/36; F16L 37/248
USPC .................. 244/135 R, 135 A; 62/50.1–50.7; 141/350, 365; 251/339, 350
See application file for complete search history.

(56) References Cited

U.S. PATENT DOCUMENTS 4,149,388 A * 4/1979 Schneider ................ F17C 7/04
62/50.3
4,608,830 A * 9/1986 Peschka .................... B60S 5/02
123/541

(Continued)

*Primary Examiner* — Matthew W Jellett
(74) *Attorney, Agent, or Firm* — Hanley, Flight & Zimmerman, LLC

(57) ABSTRACT

Methods and apparatus for cryogenic fuel bayonet transfers are disclosed. A disclosed example fuel transfer system includes a fuel tank. The example fuel transfer system also includes a bayonet receptacle extending into an internal volume of the fuel tank, where the bayonet receptacle is to receive a fuel transfer bayonet to fill the fuel tank with fuel and a fuel discharge bayonet to discharge the fuel.

24 Claims, 8 Drawing Sheets

(51) Int. Cl.
*F17C 9/00* (2006.01)
*B64C 39/02* (2006.01)
*F17C 7/02* (2006.01)
*B64D 37/30* (2006.01)
*F17C 5/02* (2006.01)
*H01M 8/04082* (2016.01)
*F16L 37/248* (2006.01)
*B64D 41/00* (2006.01)

(52) U.S. Cl.
CPC . *F17C 2270/0581* (2013.01); *H01M 2250/20* (2013.01); *Y02T 50/44* (2013.01); *Y02T 90/32* (2013.01)

(56) References Cited

U.S. PATENT DOCUMENTS

| | | | | |
|---|---|---|---|---|
| 5,018,552 A * | 5/1991 | Politi | ............... | B65D 47/02 137/614.11 |
| 5,131,429 A * | 7/1992 | Nixon | ............... | F16L 37/407 137/329.3 |
| 5,220,801 A * | 6/1993 | Butler | ............... | F17C 6/00 62/54.1 |
| 5,353,849 A * | 10/1994 | Sutton | ............... | F17C 5/007 141/18 |
| 5,365,981 A * | 11/1994 | Peschka | ............... | B60S 5/02 123/DIG. 12 |
| 5,829,791 A * | 11/1998 | Kotsubo | ............... | F16L 39/00 285/26 |
| 6,314,986 B1 * | 11/2001 | Zheng | ............... | F17C 5/02 137/240 |
| 6,550,717 B1 * | 4/2003 | MacCready | ............... | B64C 1/26 244/13 |
| 6,953,028 B2 | 10/2005 | Bingham et al. | | |
| 7,052,047 B1 * | 5/2006 | Box | ............... | F16L 59/184 285/123.15 |
| 7,195,035 B2 | 3/2007 | Pechtold | | |
| 7,546,744 B2 * | 6/2009 | Harper | ............... | F17C 1/12 141/4 |
| 8,156,961 B2 * | 4/2012 | Denis | ............... | F16K 1/306 137/613 |
| 8,161,994 B2 | 4/2012 | Rohwer et al. | | |
| 8,430,237 B2 * | 4/2013 | Westenberger | ............... | F17C 7/00 206/0.7 |
| 8,960,482 B2 * | 2/2015 | Brooks | ............... | F17C 1/12 220/560.11 |
| 2008/0006743 A1 * | 1/2008 | Miller | ............... | B64C 39/024 244/53 R |
| 2008/0308181 A1 * | 12/2008 | Denis | ............... | F17C 13/04 141/360 |
| 2009/0078321 A1 * | 3/2009 | Arnott | ............... | F17C 13/00 137/14 |

\* cited by examiner

METHODS AND APPARATUS FOR CRYOGENIC FUEL BAYONET TRANSFERS

FIELD OF THE DISCLOSURE

This disclosure relates generally to fuel transfer and, more particularly, to methods and apparatus for cryogenic fuel bayonet transfers.

BACKGROUND

Some known vehicles or aircraft such as unmanned aerial vehicles (UAVs) utilize tanks that store liquid hydrogen. In particular, gaseous hydrogen is typically converted by a chemical reaction to generate electricity, which is used to drive an electric motor of a vehicle and/or an aircraft. In some examples, this generated electricity is used to power navigation and/or control systems of an aircraft.

To utilize the liquid hydrogen as an energy source, the liquid hydrogen is provided to a storage tank (e.g., a fuel cell storage tank) using numerous fittings and/or couplings, all of which may cause loss of the liquid hydrogen and/or unintended heating of the liquid hydrogen. Further, the fittings and/or couplings can negatively impact an aircraft, for example, in terms of excess weight and/or space requirements, especially when the aircraft has limited internal volume and/or relatively low weight and/or mass fraction requirements (e.g., a UAV).

SUMMARY

An example fuel transfer system includes a fuel tank. The example fuel transfer system also includes a bayonet receptacle extending into an internal volume of the fuel tank, where the bayonet receptacle is to receive a fuel transfer bayonet to fill the fuel tank with fuel and a fuel discharge bayonet to discharge the fuel.

An example electric aircraft includes at least one bayonet receptacle extending into an internal volume of the fuel tank, where the at least one bayonet receptacle is to receive a fuel transfer bayonet to fill the fuel tank and a fuel discharge bayonet to discharge fuel from the fuel tank, and where the fuel transfer bayonet and the fuel discharge bayonet are different from one another.

An example method includes placing a fuel transfer bayonet to a bayonet receptacle of a fuel tank, providing fuel to an internal volume of the fuel tank via the fuel transfer bayonet, removing the fuel transfer bayonet, and placing a fuel discharge bayonet to the bayonet receptacle to discharge the fuel from the fuel tank.

Figure 1:
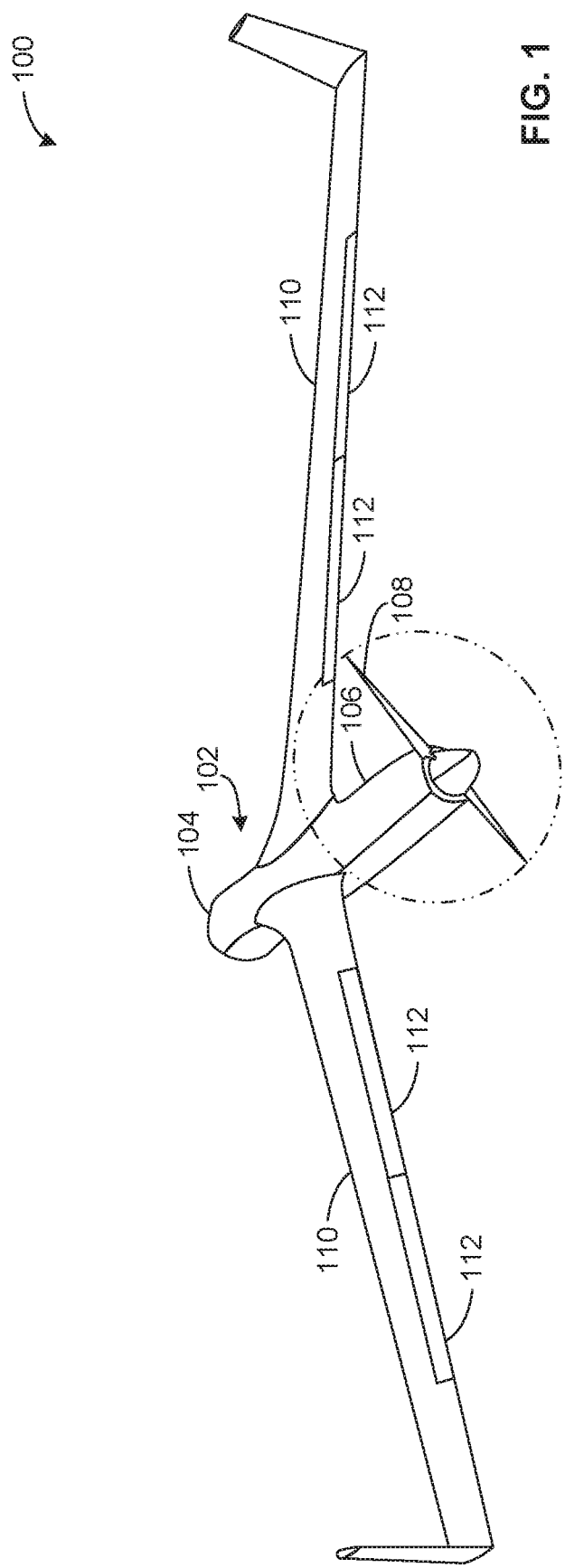
FIG. 1 is an example unmanned aerial vehicle in which the examples disclosed herein may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus for cryogenic fuel bayonet transfers are disclosed. The examples disclosed herein enable a weight-saving and cost-effective fuel transfer interface that may be implemented in conjunction with aircraft such as unmanned aerial vehicles (UAVs), electric vehicles and/or electric aircraft, which utilize cryogenic fuels such as hydrogen fuel cells, for example. In such examples, the hydrogen fuel cells are utilized for power (e.g., to power controls, instrumentation, etc.) and/or propulsion. The examples disclosed herein can also be used to reduce and/or minimize unintended heating of fuel and can reduce complexity and/or cost of components utilized in cryogenic tank filling and/or vapor discharge of liquid fuels.

FIG. 1 is an example unmanned aerial vehicle (UAV) (e.g., an electric aircraft) 100 in which the examples disclosed herein may be implemented. The UAV 100 of the illustrated example includes a fuselage 102, a guidance portion (e.g., a nose portion) 104, a propulsion system 106, a propeller 108, and wings 110 with corresponding control surfaces 112 that rotate and/or displace relative to the respective wings 110.

To direct movement and/or flight of the UAV 100, the propulsion system 106 utilizes liquid hydrogen fuel that is converted to electricity via a chemical process (e.g., the addition of oxygen) to power an electric motor which, in turn, spins the propeller 108 so that the UAV 100 is propelled forward. Further, movement of the control surfaces 112 allows the UAV 100 to be maneuvered and/or oriented during flight to navigate the UAV 100. In this example, the guidance portion 104 is directed via radio and/or a wireless network (e.g., a satellite communication network, etc.) to navigate and/or maneuver the UAV 100 by directing movement and/or rotation of the control surfaces 112 as well as throttle control of the propulsion system 106. Additionally or alternatively, the UAV 100 utilizes sensor data (e.g., image recognition data, proximity detection data, etc.) to navigate the UAV 100.

To store the liquid hydrogen fuel that is used by the propulsion system 106, for example, the UAV 100 utilizes a fuel tank (e.g., a liquid fuel tank) that stores and dispenses vapor and/or gaseous hydrogen fuel to a fuel cell which, in turn, is used to generate power for the UAV 100. In particular, gaseous hydrogen vapor may be provided to the fuel cell and mixed with oxygen and/or a gas at least partially composed of oxygen to generate electricity.

Figure 2:
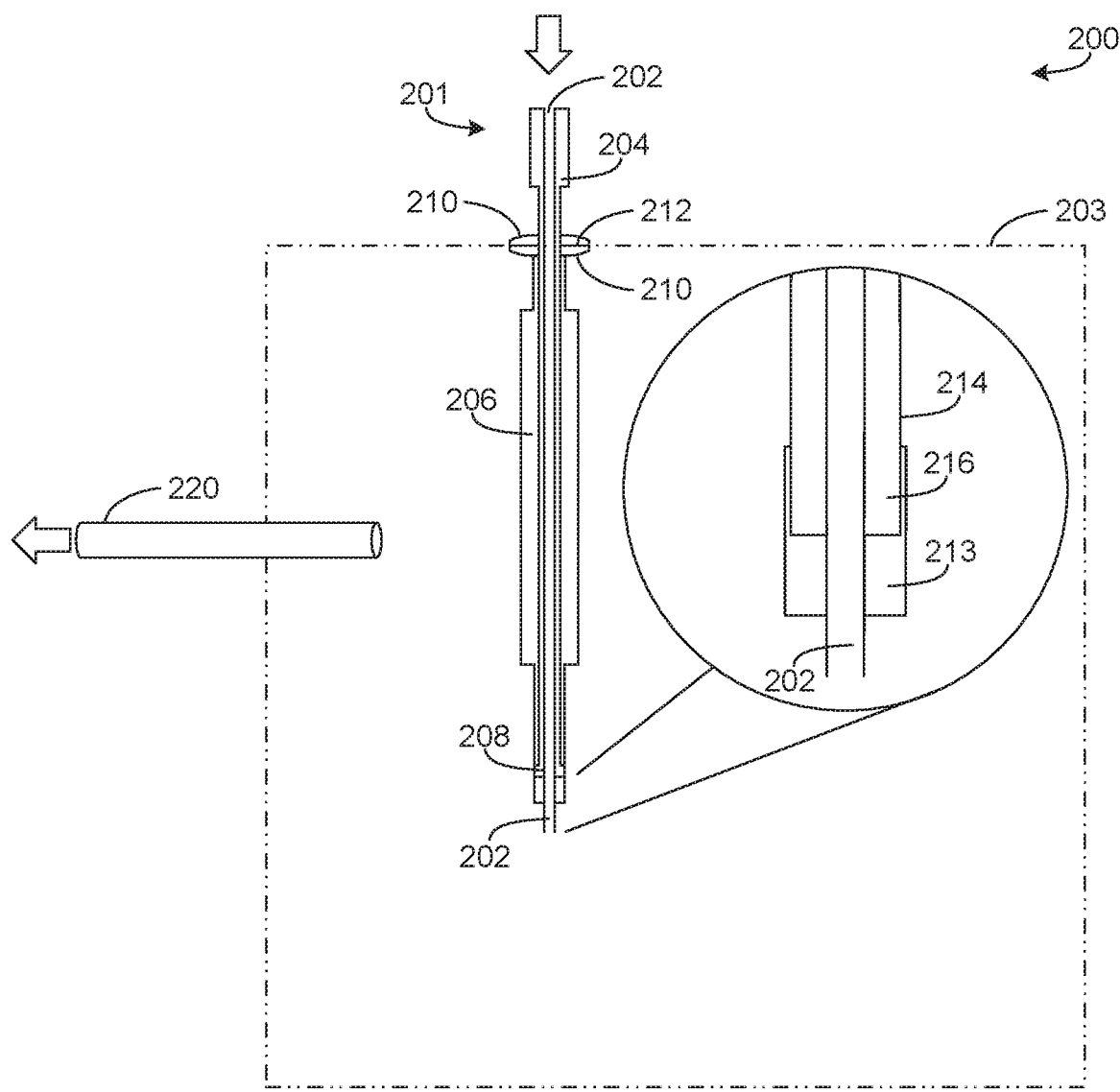
FIG. 2 is a cross-sectional view of a known fuel transfer system.

FIG. 2 is a cross-sectional view of a known fuel transfer system (e.g., a known UAV fuel transfer system) 200. The known fuel transfer system 200 includes a filling bayonet assembly 201 with a central cryogenic passage 202 extending into a fuel tank 203, a first isolation vacuum cavity 204, a second isolation vacuum cavity 206, a nose seal 208, and coupling flanges 210 with a seal 212 therebetween. As can be seen in the detailed portion of FIG. 2, the filling bayonet assembly 201 also includes an outer bayonet 213 in which an inner bayonet is 214 inserted. The inner bayonet 214 of the illustrated example defines a vapor column 216 that surrounds the central cryogenic passage 202. Further, fuel transfer system 200 includes a discharge tube 220.

In operation, the bayonet assembly 201 is used only to fill the fuel tank 203. In particular, the fuel tank 203 is filled with liquid fuel via the central cryogenic passage 202. In this example, the fuel stored in the fuel tank 203 is maintained at cryogenic temperatures. The discharge tube 220, which is integrated into the fuel tank 203, is used to discharge fuel vapor to a fuel cell system.

Because the bayonet assembly 201 does not integrate both filling and discharge functions, the fuel transfer system 200 may require significant complexity and cost to manufacture and/or service. Further, having both filling and discharge functions integrated with the fuel tank 203 may require significant weight and/or volume, which can negatively impact operation (e.g., range and/or maneuverability) of a UAV, for example.

Figure 3:
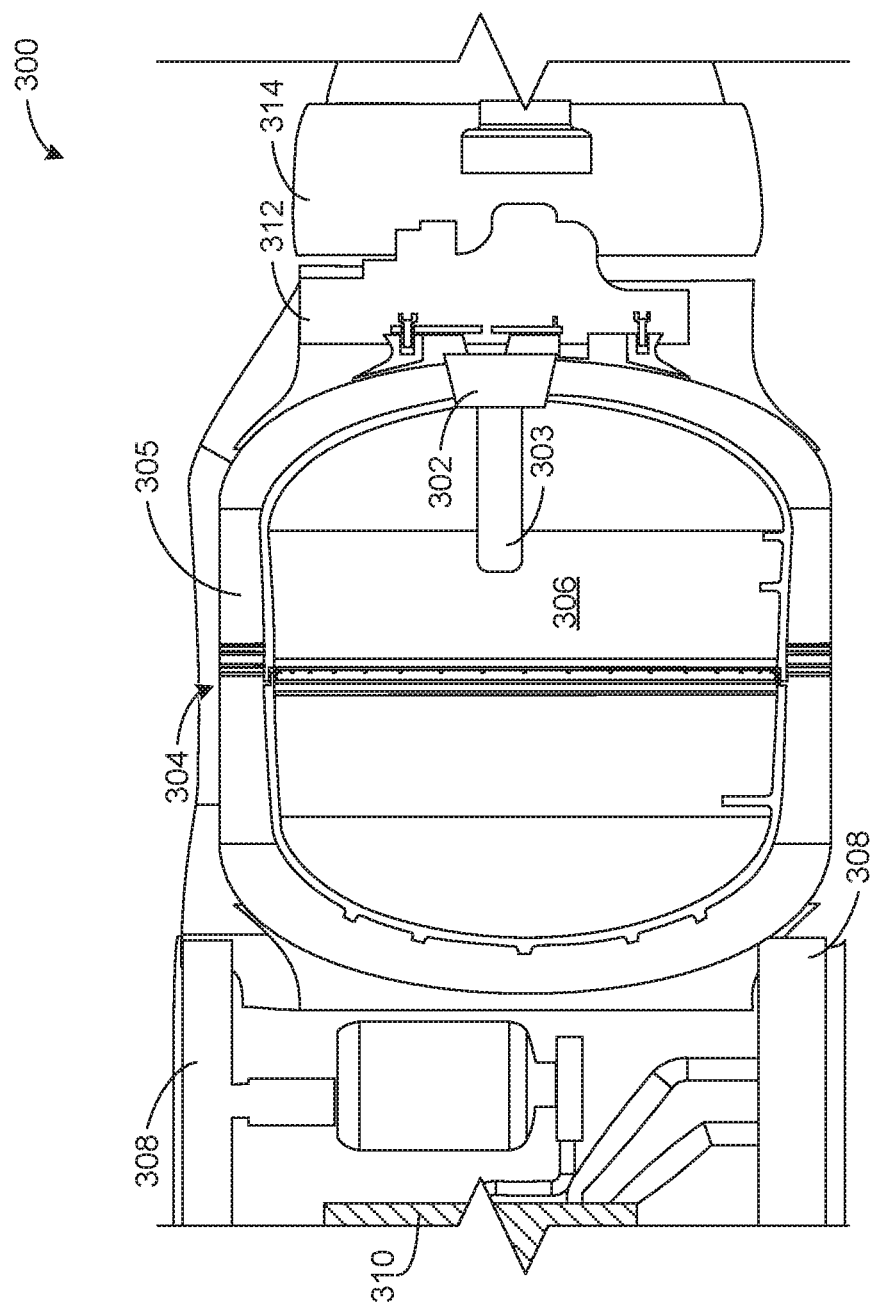
FIG. 3 is a cross-sectional view of an example fuel transfer system in accordance with the teachings of this disclosure.

FIG. 3 is a cross-sectional view of an example fuel transfer system 300 in accordance with the teachings of this disclosure. In the illustrated example of FIG. 3, the fuel transfer system 300 is shown without a fuel transfer bayonet inserted. The example fuel transfer system 300 includes an integrated fuel transfer bayonet receptacle 302 with a cylindrical portion 303 that extends into a fuel tank (e.g., a liquid hydrogen fuel tank) 304, which includes an outer surface 305 that defines an internal storage volume 306. The example fuel transfer system 300 also includes a fuel cell radial heat exchanger 308, a fuel cell 310, a motor coupler 312 and an electric motor 314. In this example, the fuel tank 304 structurally couples the electric motor 314 to the UAV 100, thereby reducing and/or eliminating structural components typically need to provide structural rigidity.

According to the illustrated example of FIG. 3, the fuel transfer bayonet receptacle 302 receives a fuel transfer bayonet (e.g., a first fuel transfer bayonet) to provide fuel to the internal volume 306. Further, the fuel transfer bayonet receptacle 302 receives and/or interchangeably receives a fuel discharge bayonet (e.g., a second fuel transfer/discharge bayonet) to discharge the fuel to power systems of the UAV 100. In particular, the fuel transfer bayonet receptacle 302 includes an opening, which is a cylindrical opening in this example, to accept the fuel transfer bayonet and the fuel discharge bayonet. In other words, the fuel transfer bayonet and the fuel transfer bayonet to be inserted into the fuel transfer bayonet receptacle 302 are interchangeable with one another. As a result, the UAV 100 does not need to include associated fuel filling components, which may require additional space and/or add additional weight to the UAV 100. In particular, the example UAV 100 only includes the weight and volume of component(s) and/or assemblies primarily related to discharging fuel from the internal volume 306 to the fuel cell 310 and does not include the weight and volume of numerous fuel filling components and/or assemblies.

In some examples, multiple fuel transfer bayonet receptacles 302 are disposed on the fuel tank 304. In such examples, simultaneous filling and/or simultaneous discharge of the fuel tank 304 amongst the multiple fuel transfer bayonet receptacles 302 may occur.

Figure 4:
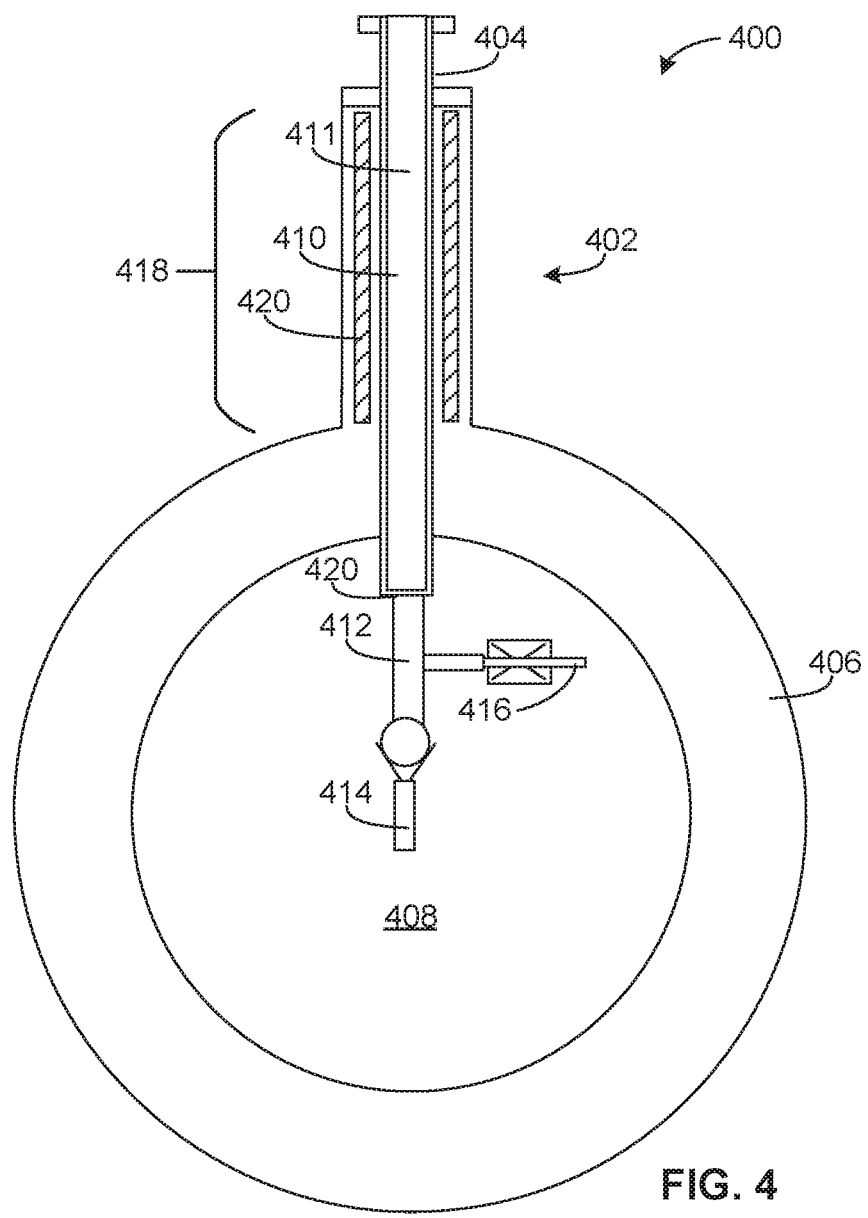
FIG. 4 is a cross-sectional view of an example fuel tank without a fuel transfer bayonet connection inserted.

FIG. 4 is a cross-sectional view of an example fuel tank 400 without a fuel transfer bayonet inserted. The example fuel tank 400, which may be utilized in the fuel transfer system 300, has a different overall shape from the example fuel tank 304 and includes a bayonet receptacle 402 with an interface portion (e.g., a cylindrical portion) 404, which is cylindrical in this example, extending from a main body portion (e.g., a circular cross-section storage portion, a spherical portion) 406 that is generally circular and/or round in this example. The example main body portion 406 defines an internal storage volume 408. The example fuel tank 400 also includes a bayonet receiving portion 410 and an exchange tip 412 to deliver and/or discharge fuel stored in the internal volume 408. In this example, the bayonet receiving portion 410 defines an internal cavity 411 to receive bayonets with different functionality. According to the illustrated example, a check valve 414 and a pressure relief valve 416 extend from the exchange tip 412. In this example, the check valve 414 and the pressure relief valve 416 are oriented substantially perpendicular to one another. As used herein, "substantially" means within 3 degrees (e.g., plus or minus 3 degrees). In some examples, the interface portion 404 includes an insulation section 418. In some examples, the check valve 414 and the pressure relief valve 416 are oriented substantially perpendicular from one another to facilitate, to improve removal of gaseous vapor from the fuel tank 400 and/or to prevent operational interference between the check valve 414 and the pressure relief valve.

To receive a bayonet, the bayonet receiving portion 410 has an inner opening, inner sealing surface and/or chamber (e.g., a cylindrical chamber or opening) defined by the internal cavity 411, which has a larger internal diameter than the exchange tip 412, thereby defining a shoulder 420. In this example, the bayonet receiving portion 410 can receive multiple types of bayonets (e.g., filling and receiving bayonets, different filling bayonets, different discharge bayonets, etc.).

To prevent unintended heat (e.g., ambient heat energy) from flowing towards fuel stored within the fuel tank 400 and/or fuel being provided to the fuel tank 400, in some examples, the insulation section 418 defines an insulated sleeve. In particular, the interface portion 404 may be insulated by an insulation layer 420 and/or insulating material of the insulation section 418. Additionally or alternatively, a vacuum and/or vacuum chamber(s) of the insulation section 418 is used to insulate the interface portion 404. In other examples, the interface portion 404 and/or the main body portion 406 are at least partially composed of an insulating material (e.g., an integral insulating material).

Figure 5:
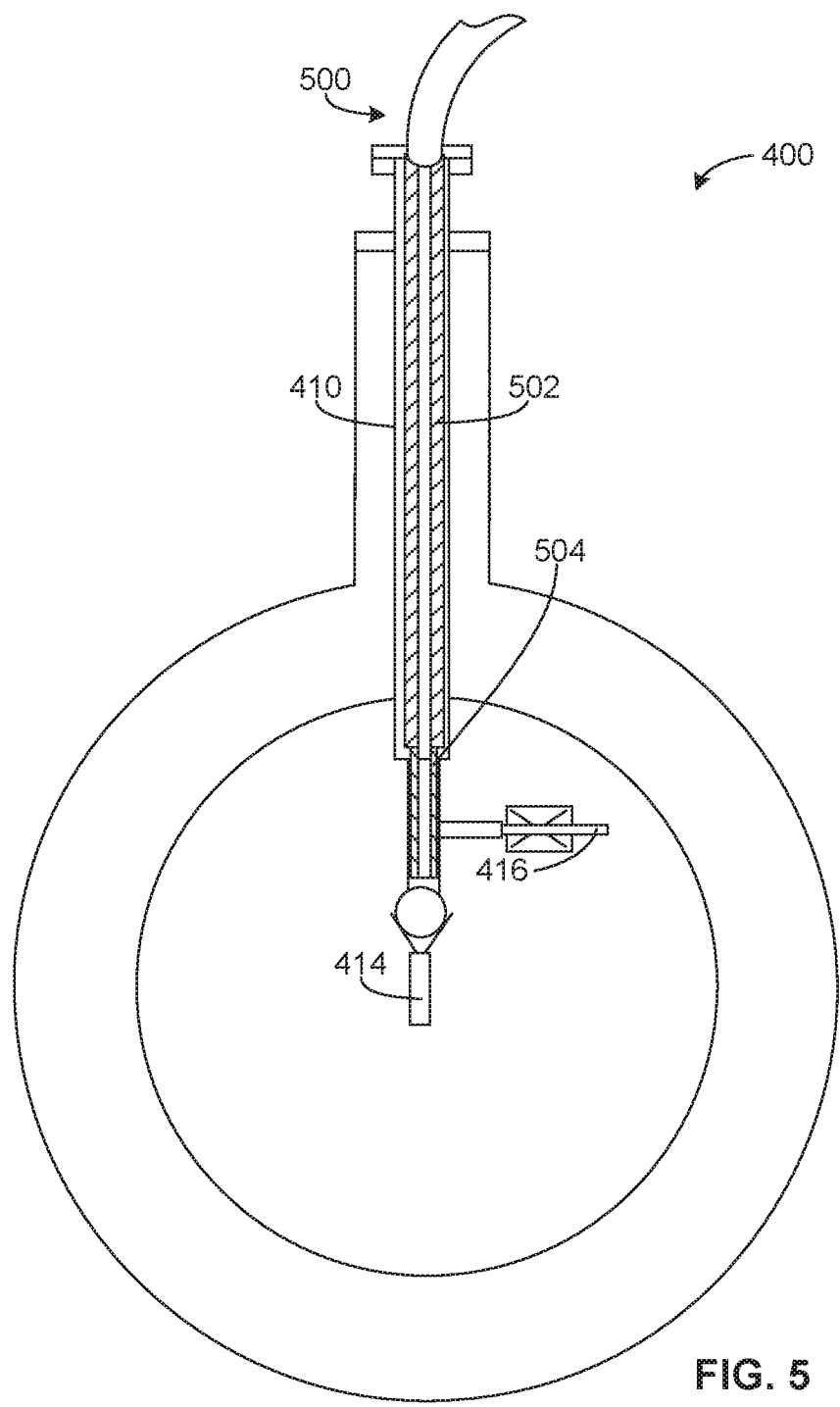
FIG. 5 is a detailed cross-sectional view of the example fuel transfer tank of FIG. 4 with a fuel transfer bayonet inserted.

FIG. 5 is a cross-sectional view of the example fuel tank 400 with a fuel transfer bayonet 500 inserted. According to the illustrated example of FIG. 5, the fuel transfer bayonet 500 includes an interface portion 502 and a distal portion 504 that is proximate both the check valve 414 and the pressure relief valve 416. In this example, the interface portion 502 is wider than the distal portion 504. In some examples, the check valve 414 is not present. Additionally or alternatively, in some examples, the pressure relief valve 416 is not present. In particular, another vapor removal device such as a controlled valve and/or fluid regulator valve may be used instead.

To provide fuel (e.g., liquid hydrogen fuel and/or hydrogen Clathrate fuel) to the fuel tank 400, the fuel transfer bayonet 500 is inserted into the bayonet receiving portion 410 such that the distal portion 504 of the fuel transfer bayonet 500 extends past the pressure relief valve 416 (along a downward direction in the view of FIG. 5), thereby bypassing the pressure relief valve 416 to be fluidly coupled to the check valve 414, which prevents liquid fuel from moving out of the fuel tank 400 via the fuel transfer bayonet 500. In this example, insertion of the fuel transfer bayonet 500 defines a fluid path between a remote fuel source (not shown) and the fuel tank 400 such that liquid fuel may be transferred from the remote fuel source to the fuel tank 400 during a filling process, for example.

In some examples, the fuel transferred into the fuel tank 400 includes a Clathrate form of Hydrogen. In particular, the fuel transferred may be hydrogen-methane and hydrogen-$H_2O$ chemistries that can increase a storage density of hydrogen from 70 grams/liter (liquid Hydrogen at 22 Kelvin and atmospheric pressure) to 900 grams/liter for methane Clathrates at approximately 80 Kelvin (K) and 300 Mega Pascal (MPa) pressure.

Figure 6:
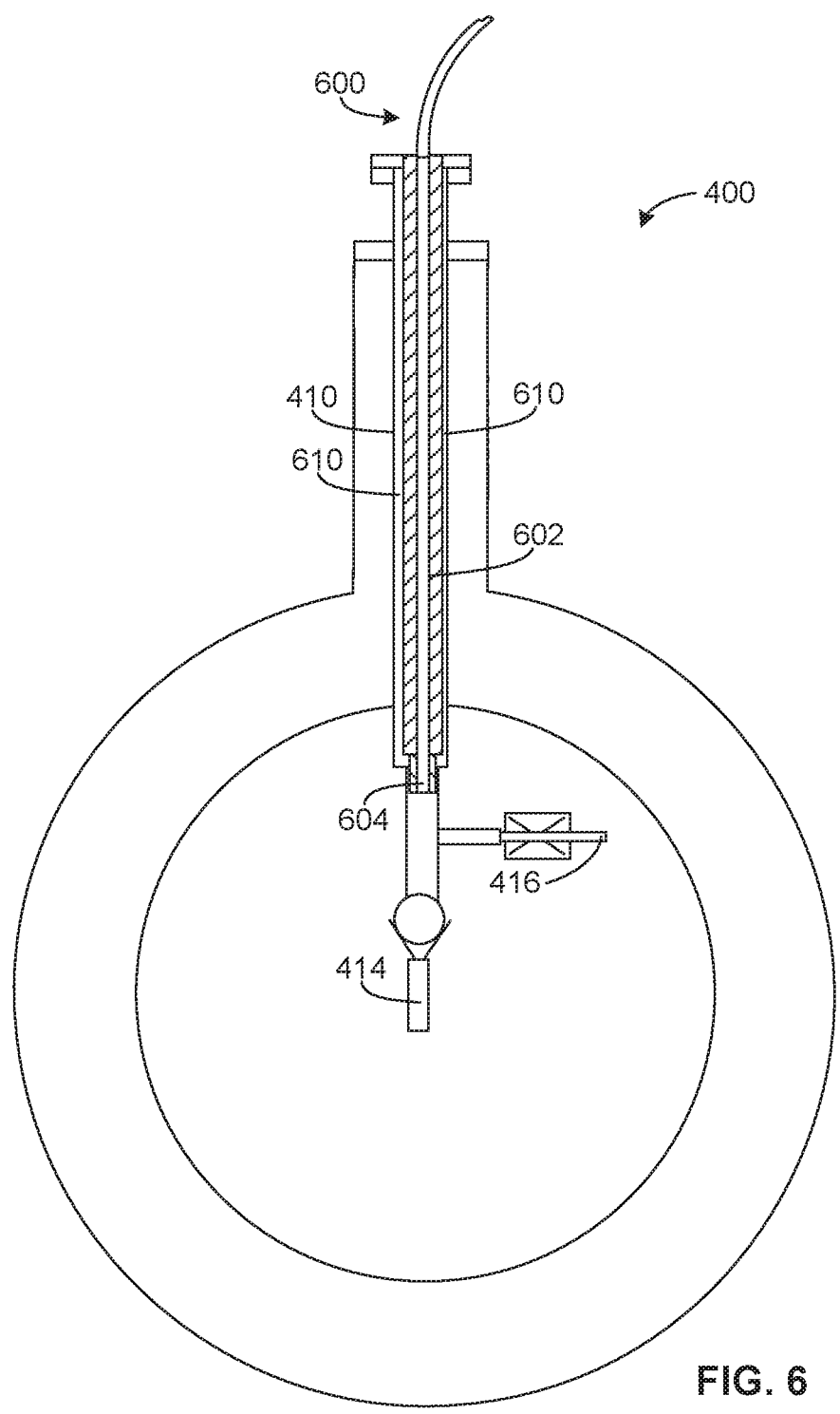
FIG. 6 is a detailed cross-sectional view of the example fuel transfer tank of FIG. 4 with a fuel discharge bayonet inserted.

FIG. 6 is a cross-sectional view of the example fuel tank 400 illustrating a fuel discharge bayonet 600 inserted into the fuel tank 400 instead of the fuel transfer bayonet 500. In particular, after the fuel tank 400 is filled using the fuel transfer bayonet 500, the fuel transfer bayonet 500 described above in connection with FIG. 5 is removed and replaced with the fuel discharge bayonet 600, utilizing the same bayonet receiving portion 410, to enable the fuel to be transferred from the fuel tank 400 to the fuel cell 310. The fuel discharge bayonet 600 of the illustrated example includes an interface portion 602 and a distal portion 604.

To discharge fuel (e.g., liquid hydrogen fuel) from the fuel tank 400, the distal portion 604 of the fuel discharge bayonet 600 extends to proximate the pressure relief valve 416 when the fuel discharge bayonet 600 is inserted into the bayonet receiving portion 410. In other words, the distal portion 604 of the fuel discharge bayonet 600 has a different length (e.g., a shorter length) than the distal portion 504 of the fuel transfer bayonet 500. In particular, this shorter length may be allow the check valve 414 and/or an outlet of the bayonet receiving portion 410 to be bypassed and/or not fluidly coupled. In this example, gas vapors of fuel stored in the fuel tank 400 are provided to the relief valve 416 and, in turn, to the fuel cell 310 via tubes and/or conduit.

In some examples, the example fuel discharge bayonet 600 and the bayonet receiving portion 410 define a pressure relief path. In such examples, excess pressure and/or pressurized gas above a threshold pressure may be relieved by the relief valve 416, thereby allowing pressurized gas to flow in a surrounding area 610 encompassing an outer diameter of the interface portion 602 and/or the distal portion 604, thereby being relieved and/or discharged from the fuel tank 400 to an environment.

Figure 7:
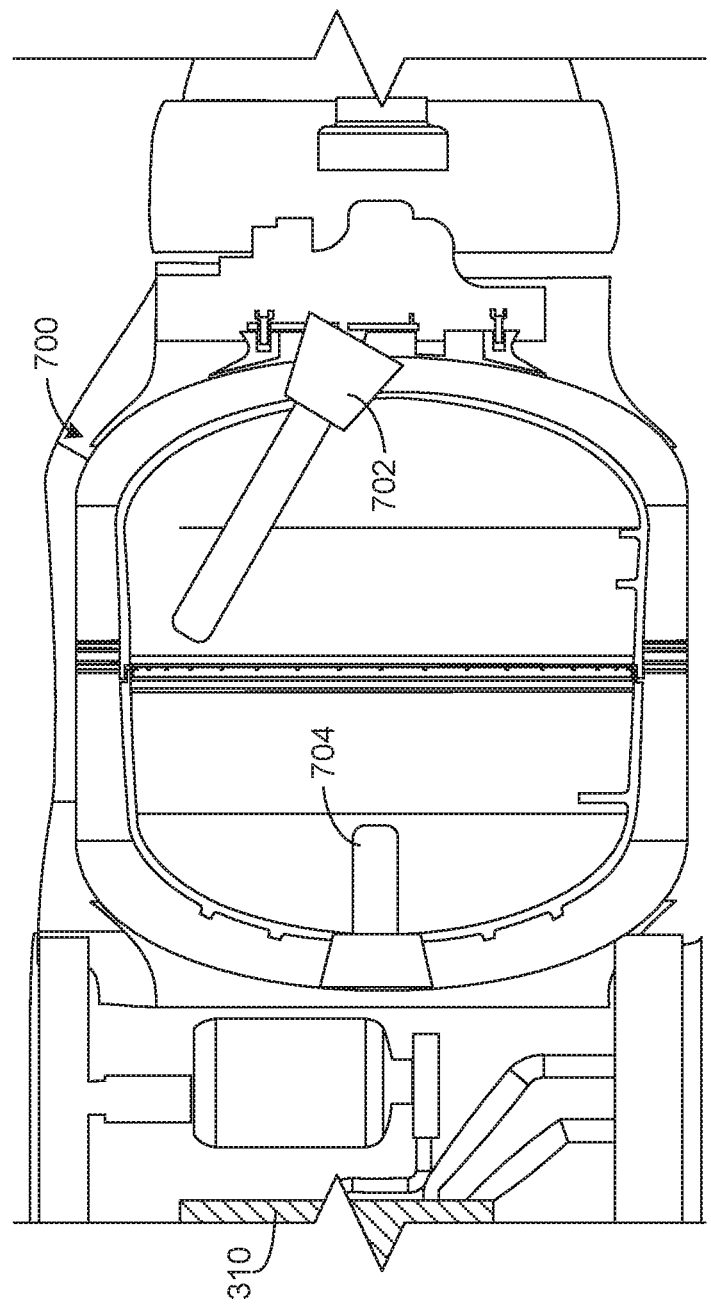
FIG. 7 is a cross-sectional view of another alternative example fuel tank with multiple bayonet receptacles.

FIG. 7 is a cross-sectional view of an alternative example fuel tank 700 having multiple bayonet receptacles instead of a single integrated bayonet receptacle, as described above in connection with FIGS. 3-6. In contrast to the fuel tanks 304 and 400, the example fuel tank 700 does not include an integrated bayonet receptacle for both filling and discharging fuel. Instead, the example fuel tank 700 includes a filling fuel transfer bayonet receptacle 702 and a separate discharging fuel transfer bayonet receptacle 704. In some examples, the filling fuel transfer bayonet receptacle 702 is angled relative to the discharging fuel transfer bayonet receptacle 704. For example, the filling fuel transfer bayonet receptacle 702 may be angled at approximately 40 to 50 degrees from the discharging fuel transfer bayonet receptacle 704. The angle of the illustrated example of FIG. 7 may be particularly advantageous in facilitating effective filling of liquid fuel while also enabling effective discharge and/or outflow of vapor to better control inlet and discharge functions of the fuel. While the examples disclosed herein show an example angular range, any appropriate angle may be used based on application and/or fuel filling or discharge needs.

To fill the example fuel tank 700, a fuel transfer bayonet such as the example fuel transfer bayonet 500 of FIG. 5 is coupled to and/or inserted within the fuel transfer bayonet receptacle 702. In this example, the fuel transfer bayonet is removed once a sufficient and/or desired amount of fuel has been added to the fuel tank 700.

To discharge the example fuel tank 700 during operation and/or flight of the UAV 100, for example, another fuel transfer bayonet such as the example fuel discharge bayonet 600 of FIG. 6 is coupled and/or inserted into the discharging fuel transfer bayonet receptacle 704 to provide gaseous hydrogen to the fuel cell 310. In some examples, the fuel transfer bayonet is not removed from the discharging fuel transfer bayonet receptacle 704 when filling the fuel tank 700 via the fuel transfer bayonet receptacle 702.

Figure 8:
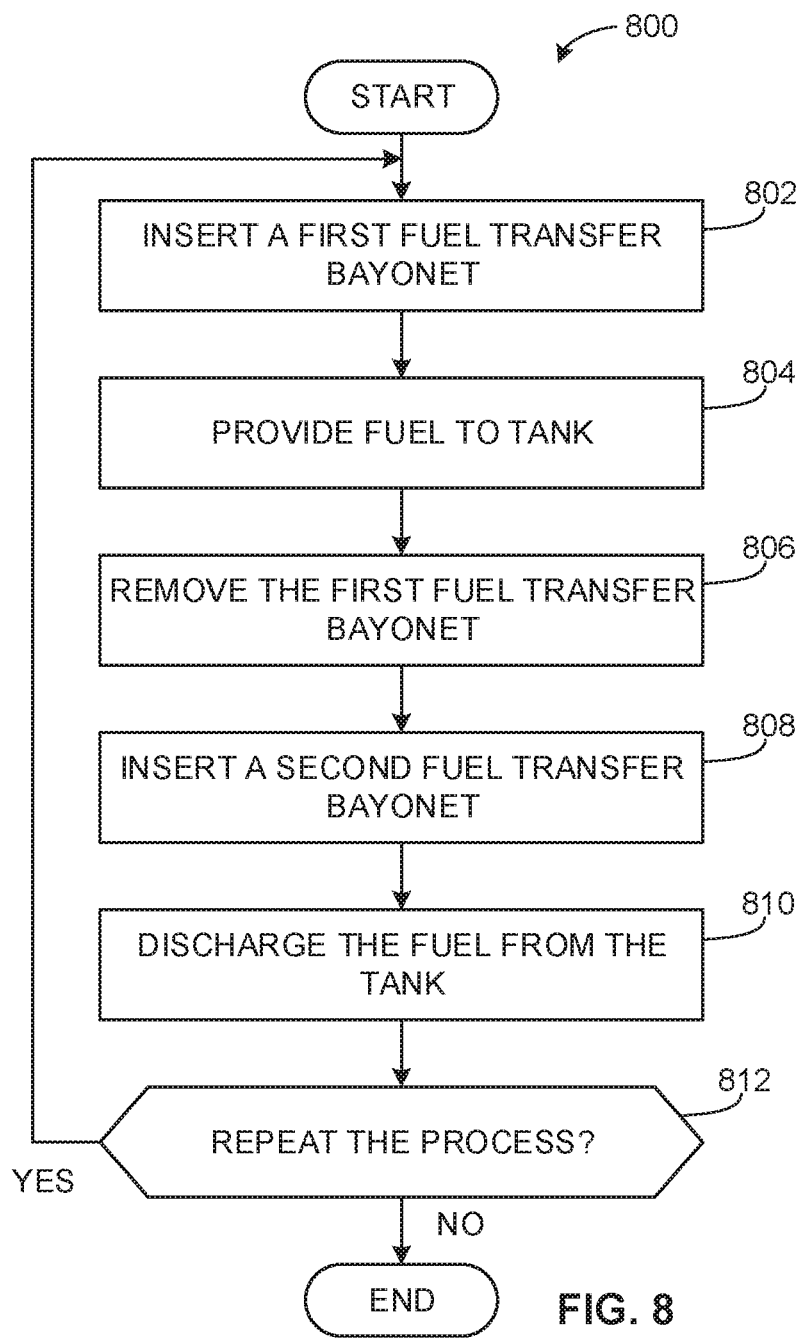
FIG. 8 is a flowchart representative of an example method to implement the examples disclosed herein.

FIG. 8 is a flowchart representative of an example method 800 to implement the examples disclosed herein. The example method 800 begins as a UAV (e.g., the UAV 100) is being prepared for flight. In this example, the UAV requires liquid hydrogen fuel to be provided to a fuel tank of the UAV prior to flight.

According to the illustrated example, a fuel transfer bayonet (e.g., the fuel transfer bayonet 500) is inserted into a fuel transfer bayonet receptacle (e.g., the bayonet receptacle 402) (block 802). In this example, the fuel transfer bayonet is inserted into an opening of an insulated column that extends from a main body of the fuel tank.

Next, fuel is provided to the fuel tank (block 804). In particular, liquid fuel flows through the fuel transfer bayonet and into the fuel tank via a check valve until a desired amount of fuel is stored in the fuel tank and/or the fuel tank is filled.

The fuel transfer bayonet is removed from the fuel tank (block 806). In particular, the fuel transfer bayonet is removed after a desired amount of fuel has been provided to the fuel tank.

A fuel discharge bayonet is inserted into the fuel transfer bayonet receptacle (block 808). According to the illustrated example, the fuel discharge bayonet is a fuel discharge bayonet such as the fuel discharge bayonet 600 of FIG. 6.

The fuel is discharged from the fuel tank (block 810). For example, the fuel may be discharged in vapor form to produce electricity that is used for propulsion and control systems, for example, while the example UAV is in flight.

Next, it is determined whether the process is to be repeated (block 812). If the process is to be repeated (block 812), control of the process returns to block 802. Otherwise, the process ends. This determination may occur based on whether the UAV is in flight and/or when the UAV is determined to require fuel replenishment.

From the foregoing, it will be appreciated that the above disclosed methods, apparatus and articles of manufacture enable the manufacture of aircraft with reduced weight and/or volume by utilizing a multifunction bayonet receptacle that receives a filling bayonet as well as a discharge bayonet, for example, thereby reducing an amount of integrated parts necessary for a vehicle and/or aircraft. Some of the examples disclosed herein enable effective cryogenic temperature control of fuel provided to a fuel tank. In some examples, integrating filling and discharge of fuel from the fuel transfer bayonet receptacle enables a less complex fuel tank design and/or fuel transfer components, thereby reducing associated costs and weight.

An example method includes providing a bayonet receptacle to a fuel tank, where the bayonet receptacle is to receive a fuel transfer bayonet to receive fuel during filling of the fuel tank, and where the bayonet receptacle is to receive a fuel discharge bayonet to discharge the fuel from the fuel tank.

In some examples, the example method includes coupling an exchange portion to the bayonet receptacle, where the exchange portion is to include at least one of a check valve or a pressure relief valve. In some examples, the fuel tank is a liquid hydrogen fuel tank. In some examples, the fuel tank stores a Clathrate form of hydrogen. In some examples, the example method further includes assembling the fuel tank to an unmanned aerial vehicle.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent. While the examples disclosed herein are related to aircraft and/or UAVs, the examples disclosed herein may be applied to any appropriate applications and/or vehicles that are related to the transfer of fuel. For example, the examples disclosed herein may be applied to terrestrial, airborne, or space born vehicles, which may be manned or un-manned.

What is claimed is:

1. A fuel transfer system comprising:
  a fuel tank;
  a bayonet receptacle extending into an internal volume of the fuel tank, the bayonet receptacle having an opening to receive a fuel transfer bayonet to fill the fuel tank with fuel and to receive a fuel discharge bayonet to discharge the fuel; and
  an exchange portion disposed within the internal volume, the exchange portion including a check valve and a relief valve, the check valve for filing the internal volume with the fuel via the fuel transfer bayonet, the relief valve for emptying the fuel from the internal volume via the fuel discharge bayonet, wherein pressure from the fuel exiting the fuel transfer bayonet opens the check valve when the fuel transfer bayonet is inserted into the bayonet receptacle and the check valve remains closed when the fuel discharge bayonet is inserted into the bayonet receptacle, and wherein a pressure relief path of the fuel discharge bayonet fluid biases the relief valve to an open position when the fuel discharge bayonet is inserted into the bayonet receptacle.

2. The fuel transfer system as defined in claim 1, wherein the check valve extends from the exchange portion.

3. The fuel transfer system as defined in claim 1 wherein the relief valve extends from the exchange portion.

4. The fuel transfer system as defined in claim 3, wherein the check valve and the relief valve are oriented substantially perpendicular to one another within the fuel tank.

5. The fuel transfer system as defined in claim 1, further including an insulation layer at least partially surrounding the bayonet receptacle.

6. The fuel transfer system as defined in claim 1, wherein the fuel tank is disposed within an unmanned aircraft, and wherein the fuel discharge bayonet is to discharge the fuel to a fuel cell of the unmanned aircraft.

7. An electric aircraft comprising:
  a fuel tank;
  at least one bayonet receptacle extending into an internal volume of the fuel tank, the at least one bayonet receptacle having an opening to receive a fuel transfer bayonet to fill the fuel tank and a fuel discharge bayonet to discharge fuel from the fuel tank, the fuel transfer bayonet and fuel discharge bayonet different from one another; and
  an exchange portion disposed within the internal volume, the exchange portion including a check valve and a relief valve, the check valve for filing the internal volume with the fuel via the fuel transfer bayonet, the relief valve for emptying the fuel from the internal volume via the fuel discharge bayonet, wherein pressure from the fuel exiting the fuel transfer bayonet opens the check valve when the fuel transfer bayonet is inserted into the bayonet receptacle and the check valve remains closed when the fuel discharge bayonet is inserted into the bayonet receptacle, and wherein a pressure relief path of the fuel discharge bayonet fluid biases the relief valve to an open position when the fuel discharge bayonet is inserted into the bayonet receptacle.

8. The electric aircraft as defined in claim 7, further including a cylindrical portion of the fuel tank at least partially surrounding the at least one bayonet receptacle.

9. The electric aircraft as defined in claim 8, wherein the cylindrical portion includes an insulating material or a vacuum.

10. The electric aircraft as defined in claim 8, wherein the cylindrical portion extends from a main body portion of the fuel tank.

11. The electric aircraft as defined in claim 7, wherein the at least one bayonet receptacle includes first and second bayonet receptacles, the first bayonet receptacle to receive the fuel transfer bayonet, the second bayonet receptacle to receive the fuel discharge bayonet.

12. The electric aircraft as defined in claim 11, wherein the first bayonet receptacle is oriented at an angle of approximately 40 to 50 degrees from the second bayonet receptacle.

13. The electric aircraft as defined in claim 7, wherein the electric aircraft is an unmanned aircraft.

14. A method comprising:
  placing a fuel transfer bayonet in an opening of a bayonet receptacle of a fuel tank, wherein an exchange portion is disposed within an internal volume of the fuel tank, the exchange portion including a check valve and relief valve;
  providing fuel to the internal volume of the fuel tank via the fuel transfer bayonet, wherein pressure from the fuel exiting the fuel transfer bayonet opens the check valve;
  removing the fuel transfer bayonet; and
  placing a fuel discharge bayonet in the opening of the bayonet receptacle to discharge the fuel from the fuel tank wherein when the fuel discharge bayonet is inserted into the bayonet receptacle, the check valve remains closed, and wherein a pressure relief path of the fuel discharge bayonet fluid biases the relief valve to an open position when the fuel discharge bayonet is inserted into the bayonet receptacle.

15. The method as defined in claim 14, further including coupling a tube associated with the fuel discharge bayonet to a fuel cell of an electric vehicle.

16. The method as defined in claim 14, wherein placing the fuel transfer bayonet defines a fluid discharge path through the check valve disposed within the internal volume of the fuel tank.

17. The method as defined in claim 14, wherein placing the fuel transfer bayonet and the fuel discharge bayonet are inserted into an insulated sleeve.

18. The fuel transfer system as defined in claim 1, wherein the relief valve is located at a first distance from the opening of the bayonet receptacle, and wherein the check valve is located at a second distance from the opening of the bayonet receptacle, the second distance different than the first distance.

19. The fuel transfer system as defined in claim 1, further including a first shoulder of the bayonet receptacle, wherein second and third shoulders of the fuel transfer bayonet and the fuel discharge bayonet, respectively, are to contact the first shoulder of the bayonet receptacle.

20. The fuel transfer system as defined in claim 19, wherein the fuel transfer bayonet includes a first distal portion extending from the second shoulder at a first length, and wherein the fuel discharge bayonet includes a second distal portion extending from the third shoulder at a second length, the first length greater than the second length.

21. The fuel transfer system as defined in claim 4, wherein the check valve extends along a longitudinal axis of the bayonet receptacle, and wherein the relief valve extends substantially perpendicular to the longitudinal axis.

22. The fuel transfer system as defined in claim 1, wherein the fuel discharge bayonet includes a vaporization bayonet to convert liquid in the fuel tank to gas.

23. The fuel transfer system as defined in claim 22, wherein the liquid includes liquid hydrogen and the gas includes gaseous hydrogen.

24. An electric aircraft comprising:
a fuel tank; and
at least one bayonet receptacle extending into an internal volume of the fuel tank, the at least one bayonet receptacle having an opening to receive a fuel transfer bayonet to fill the fuel tank and a fuel discharge bayonet to discharge fuel from the fuel tank, the fuel transfer bayonet and fuel discharge bayonet different from one another, wherein the at least one bayonet receptacle includes first and second bayonet receptacles, the first bayonet receptacle to receive the fuel transfer bayonet, the second bayonet receptacle to receive the fuel discharge bayonet, and wherein the first bayonet receptacle is oriented at an angle of approximately 40 to 50 degrees from the second bayonet receptacle.

\* \* \* \* \*